United States Patent [19]

Purdum

[11] Patent Number: 5,018,207
[45] Date of Patent: May 21, 1991

[54] APPARATUS FOR OBJECTIVELY GRADING CENTERING CONDITION OF A STAMP

[76] Inventor: Jack Purdum, 7650 Rutherglen Way, Indianapolis, Ind. 46254

[21] Appl. No.: 408,684

[22] Filed: Sep. 18, 1989

[51] Int. Cl.$^5$ .............................................. G06K 9/32
[52] U.S. Cl. ...................................... 382/1; 382/46; 382/48
[58] Field of Search .............. 382/1, 48, 46; 209/584, 209/900, 598, 939; 356/375

[56] References Cited

U.S. PATENT DOCUMENTS

| | | | |
|---|---|---|---|
| 3,412,993 | 11/1968 | Giori | 270/1 |
| 4,367,045 | 1/1983 | Grosvernier | 356/394 |
| 4,680,806 | 7/1987 | Bolza-Schünemann | 382/65 |
| 4,698,511 | 10/1987 | Sueda et al. | 250/560 |
| 4,730,927 | 3/1988 | Ototake et al. | 356/371 |
| 4,744,663 | 5/1988 | Hamashima et al. | 356/375 |
| 4,744,664 | 5/1988 | Offt et al. | 356/375 |
| 4,953,230 | 8/1990 | Kurose | 382/46 |
| 4,955,062 | 9/1990 | Terui | 382/8 |

Primary Examiner—Leo H. Boudreau
Assistant Examiner—Steven P. Klocinski
Attorney, Agent, or Firm—Woodard, Emhardt, Naughton, Moriarty & McNett

[57] ABSTRACT

A philatelic stamp grading invention includes image digitizing hardware for creating a two-dimensional array of data bytes corresponding to the digitized image of the stamp. A computer executes a program which analyzes the stamp image data and determines the minimum border width of each side of the stamp between the edges of the stamp and the design or vignette of the stamp. A centering index is calculated from the minimum border values determined for each edge of the stamp. A printer is also shown providing means for printing the centering index, as well as printing out a hard copy of the computer analyzed stamp image.

19 Claims, 7 Drawing Sheets

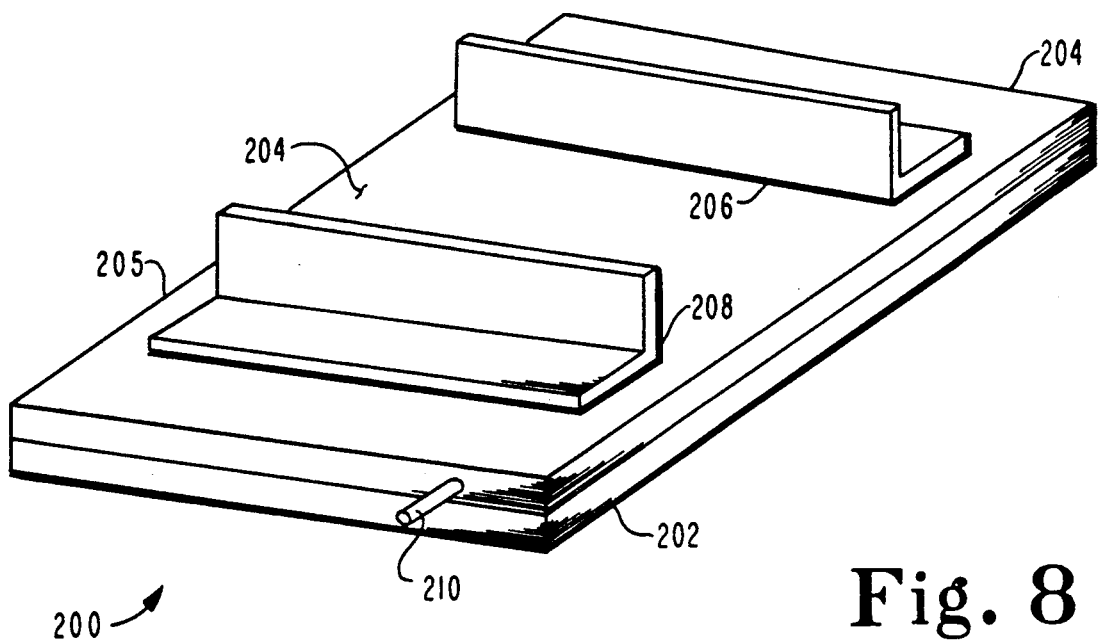
Fig. 8
Fig. 9
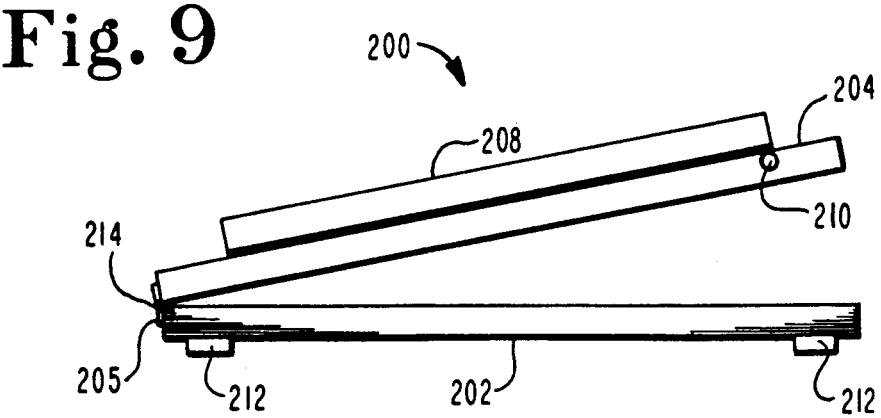

APPARATUS FOR OBJECTIVELY GRADING CENTERING CONDITION OF A STAMP

BACKGROUND OF THE INVENTION

1. Field of the Invention

This invention relates to computer systems having vision analysis hardware, and more particularly to systems including image digitization hardware and computer analysis of the digitized image data.

2. Description of the Prior Art

Collecting, accumulating, or investing in stamps, commonly known as philately, is a widespread and popular hobby and investment pastime. Serious stamp collectors, or philatelists, concern themselves primarily with the condition of the stamp in order to determine a fair market value for the stamp. Stamps in choice condition are certainly more pleasing to own and display. The finer the condition of the stamp, the more desirable and more valuable the stamp is to other collectors.

Collectors use a classification scheme for determining the condition and/or state of preservation of stamps. The centering quality of a stamp is the positional relationship between the design and the unprinted space between the design and the edge of the stamp's paper. In order, from best to worst, the centering grades in philately are Superb, Extremely Fine, Very Fine, Fine, and Very Good. A Superb stamp is without visible flaws. It has rich color, full perforations or wide margins if an imperforate variety, full undamaged gum if mint, lightly cancelled if used, is perfectly centered as visually feasible, and with absolutely no defects. Extremely Fine stamps are about the best that can be expected of 19th Century U.S. stamps. An Extremely Fine stamp is ever so slightly off-center, but closely approaching Superb centering. Of course, it has no damages but has original gum (that may be a bit disturbed or lightly hinged) if mint. If cancelled, the cancellation is light and does not detract from the stamps overall beauty. Very fine stamps are not perfect. Most of the stamps in a high quality collection will probably grade Very Fine. Such stamps have a ready market for buying or selling, and will satisfy all but the most discriminating collectors. Very Fine stamps may be quite off center when matched next to a properly graded Extremely Fine example. Fine stamps are not damaged unless otherwise noted, have designs untouched by the perforations although it may be close, and if cancelled are not totally obliterated, and if unused have some of the original gum. Very Good stamps are quite off center with the design cut by the stamps edge or the perforations.

Stamps can be further graded below very good in the following descending order: Good, Fair and Poor. The distinction between these inferior grades is debatable. Most often they are damaged stamps with one or several devastating defects. Such defects may include: a completely obliterating cancellation mark; a large tear; one or more pin holes observable with the naked eye; large pieces of the stamp's paper torn off; ink scrapes; creases; stains; severe color changes; or no margins.

As is apparent from the above, the categorization or grading of a stamp is largely a subjective operation. Stamp grading services are available to the stamp grader, however, in regard to the grading of the centering quality of a stamp, the naked eye is the instrument used by the stamp grading services to determine centering. As reasonable minds, or naked eyes, may differ in categorizing a stamp according to centering quality, an objective system or apparatus for grading the centering quality of a stamp would certainly be welcomed by stamp collectors. A totally objective method and apparatus for grading the centering quality of a stamp will enable all stamp grading services to provide a repeatable and accurate categorization of stamp centering. An objective stamp grading system providing a numerical index for centering quality will provide an absolute criterion for centering quality and thus serve the philatelist in determining the investment or trading value of a particular stamp.

The philatelic community will directly benefit from an objective and reliable centering quality index. A standard index for centering quality will encourage sales of sight unseen stamps via stamp trading periodicals, as well as promote fair trade among philatelists by eliminating the subjective evaluation of stamp value attributable to centering.

SUMMARY OF THE INVENTION

The present invention relates to a new and unique computerized objective evaluation system for grading the centering quality of a stamp. According to one embodiment, such a system would include an image digitizing means for transforming an image of a stamp having a blank border surrounding a vignette into a plurality of digital data values, digital analysis means for analyzing the digital data values, memory means for reading in and storing the digital data values from the image digitizing means, means for analyzing the digital data and determining four border width values representing the minimal distance from the stamp vignette to the innermost edge of each side of the rectangular border, and means for calculating a centering index from the four border width values.

According to another embodiment of the invention, a computer is programmed to determine the relationship between the design and the unprinted space or border between the design and the edges of a substantially rectangular stamp, with the computer performing the sequential steps of: digitizing an image of the stamp and producing a set of data points corresponding to a maximum resolution digitization of the stamp image, locating the four edges of the stamp by analyzing the data points and determining the relative of each edge of the stamp, determining four border width values measured in terms of data points, each border width value determined by measuring from each edge of the stamp to the design, calculating a centering index using the four width values, and displaying the centering index.

One object of the stamp grading invention is to provide a standardized grading of the centering quality of a stamp.

Another object of the invention is to provide a stamp grading apparatus and method for repeatably producing a grading index representing the centering quality of the stamp.

Related objects and advantages of the present invention will be apparent from the following description.

BRIEF DESCRIPTION OF THE DRAWINGS

FIG. 8 is a perspective view of a stamp fixture according to the present invention.

FIG. 9 is a side view of the stamp fixture according to the present invention.

DESCRIPTION OF THE PREFERRED EMBODIMENT

Figure 1:
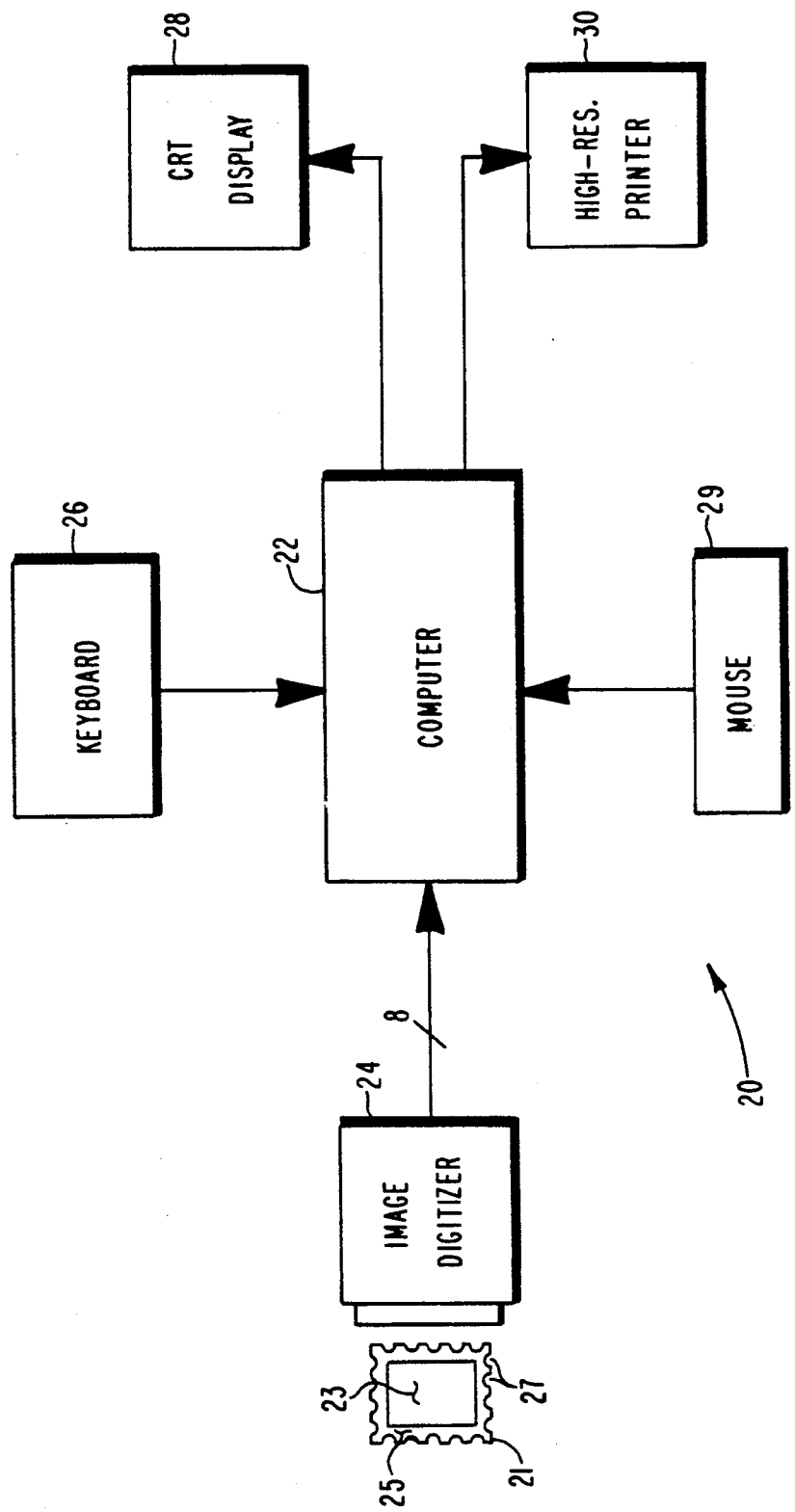
FIG. 1 is a block diagram of the stamp grading computer system according to the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, a block diagram of the computer grading system 20 according to the present invention is shown. Stamp 21 includes a vignette or design area 23, border 25, and perforation markings 27, which surround the outer edges of the border 25. Image digitizer 24 is positioned over stamp 21 and when activated produces a set of data values or data points which digitally describe the image in the field of view of the image digitizer 24. The data values are supplied to computer 22 via a standard computer I/O interface. A keyboard 26, CRT (cathode ray tube) display device 28 and high resolution printer 30 are shown connected to computer 22. Computer 22 is programmed to analyze the data supplied from image digitizer 24 and calculate a centering index representing an objective measurement of the centering quality of stamp 21. The centering index may be displayed on CRT 28, or printed in hard copy form on high resolution printer 30. Additionally, a high resolution printout of the digital image of the stamp 21 can be printed on a printer 30 thereby providing a hard copy printout of the digital image analyzed by computer 22.

The hardware of the system 20 is comprised of readily available off-the-shelf hardware. Computer 22 is a Deskpro 286 model computer system manufactured by Compaq Incorporated which features an Intel 80286 CPU. Further, the Compaq computer includes a 20 megabyte hard disk storage system, and at least one megabyte of random access memory or RAM. Computer 22 also includes an MS-DOS 3.1 operating system as a user interface program. Any similarly equipped IBM compatible computer system can substitute for the Compaq Deskpro 286 system.

The CRT display 28 is any commercially available computer monitor capable of minimally 620×350 pixel resolution. The preferred embodiment system includes an Amdek Model No. 722 CRT and an Enhanced Graphics Adaptor (EGA) video card. It should be noted, however, that virtually any monochrome or color video display hardware device with EGA or higher resolution capability can be used in the stamp grading system. A mouse 29, a device used in conjunction with personal computers such as the Compaq computer, provides a convenient user I/O interface device for controlling computer operations. The mouse 29 is a Logitec Model 37-3F-9F with a software driver supplied from the same source.

The image digitizer 24 of FIG. 1 is manufactured by DFI Incorporated, 2544 Port Street, West Sacramento, Calif., 95691, Model No. HS-3000 scanner. The DFI scanner is capable of scanning a 105 mm image at a resolution of 100, 200, 300, or 400 dots per inch (dpi). The DFI scanner uses 1 of 4 encoding methods; black and white, and 3 half-tone patterns. The DFI scanner is connected via cabling to a circuit board that plugs into the mother board of the host computer system 22. A direct memory access (DMA) data transfer is effected by the DFI image digitizer when transferring the information digitally describing the image from image digitizer 24 to computer 22. Typically, during a DMA transfer, the computer CPU is interrupted from its normal processing mode, and remains in a suspended state or holding pattern until the peripheral device releases the CPU thereby indicating the end of the DMA transfer. The scanning speed of the DFI image digitizer varies from 2 to 8 centimeters per second, depending upon the hardware or software switches setup by the user.

The HS-3000 image digitizer is supplied with software which executes or runs in an MS-DOS environment. The HS-3000 software facilitates the digitizing of an image and provides routine drivers to write the data accumulated during the digitizing process into a disc file. One form of file that is created by the HS-3000 device is a .CUT file which is the digitized image in a compressed format used to save storage space on the disc. The .CUT file is a file format well know to those skilled in the art in the image digitizing art, and is useful for minimizing file size requirements for storing a digitizing image.

The HS-3000 software also provides routines for manual manipulation of image data if the user so desires. This may be desired prior to creation of a .CUT file containing the digitized image data to correct improper data due to errors in image digitization or to remove cancellation marks which interfere with the centering index program.

The high resolution printer 30 shown in FIG. 1 is a Laserjet series printer manufactured by Hewlett Packard.

Figure 2:
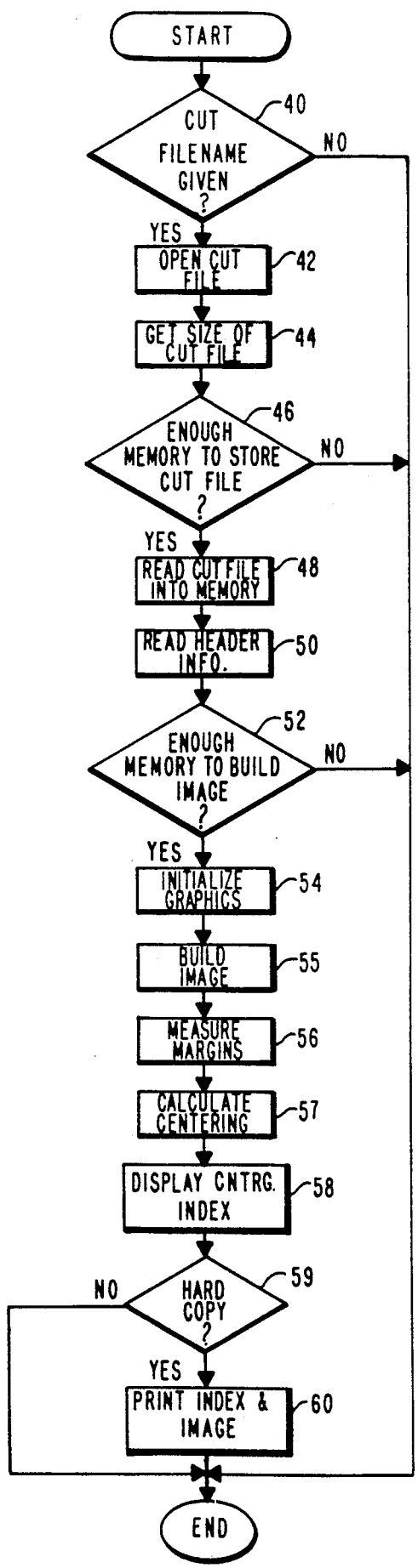
FIG. 2 is a flowchart of the main level program according to the present invention.

Referring now to FIG. 2, a flow chart for the stamp grading system software is shown. Essentially the software is comprised of three main parts. The first portion corresponds to steps 40 through 55 wherein the image is digitized and the data is prepared for analysis. Steps 56 and 57 include the actual analysis of the digitized image data, and steps 58 through 60 comprise the third portion of the program wherein the centering index is either displayed on a visual display device such as the CRT 28 and optionally printed out in hard copy form by printer 30.

The main flow of the stamp grading software begins with step 40 of FIG. 2 wherein the software initially determines whether or not a .CUT file name has been provided to the system via the keyboard 26. If no file name has been provided, program execution ends. If a file name has been given, in particular the prefix for a file name which ends in the suffix ".CUT", program execution will continue with step 42 wherein the file name entered having the .CUT suffix as part of its file name, hereinafter referred to as the .CUT file, will be opened. Subsequently, at step 44, the size of the .CUT file is determined, and at step 46 the computer ascertains whether or not enough on board RAM memory is available in order to store the entire .CUT file as retrieved from the hard disk in electronic memory. If enough memory is not available, the program will end. If sufficient memory is available for bringing the entire .CUT file into RAM, program execution will continue at step 48 where the computer 22 will read the entire .CUT file into RAM. Following step 48, the computer, at step 50, will read the file header information of the .CUT file from a memory location containing the size of the .CUT file and total number of bytes in the file. At step 52, the computer will determine whether there is sufficient available RAM to expand the compressed .CUT file and build the entire image in memory. For example, if the image is digitized into a 620×350 pixel resolution image, the memory size required in order to build the entire image is approximately 217,000 bytes. If the computer determines that sufficient memory is presently unavailable at step 52, program execution will end. If sufficient enough memory is available, then program execution will continue at step 54 where the computer will initialize the graphics by way of a commercially available graphics initialization routine and thereafter build the stamp image in memory by allocating and filling 217,000 bytes of memory with the data gathered for the above 620×350 pixel resolution image.

At step 55, the computer will expand the compressed format of the .CUT file into a two-dimensional array of bytes such that a direct correspondence between a byte in memory and a pixel in the digitized image exists. The purpose behind expanding the compressed file to obtain a one for one correspondence between pixels and data bytes in memory is to facilitate analysis of the data in memory. As an example of the compression format used in the .CUT file, a row of pixels all having the same color which is 200 pixels wide would require only two bytes to fully describe the data rather than 200 bytes. This is accomplished in the compression technique by storing a color byte value and in the following byte storing a value indicating how many pixels in a row are the color indicated by the first byte. This technique proves useful in compressing the image data for mass storage purposes and conserving disk space. Thus, the odd bytes in a .CUT file will describe color and the even bytes will describe the length of the row of pixels which are the color of the previous byte. End of line bytes are also present in the .CUT file to mark the end of individual lines of the scanned image.

Following step 55, the margins or border widths of the stamp are measured at step 56 by analyzing the data in memory and determining where the image data values change.

After all four margins, top, left, bottom, right, have been measured, the centering index is then calculated at step 57 by the computer. The following algorithm describes the steps used to calculate a centering index, thereby objectively evaluating the centering quality of the stamp:

1. Find the maximum border width for the four sides of the stamp.
2. For each border width that equals the maximum value, add one to a value to be used as a denominator in a subsequent calculation.
3. For each border width, calculate a ratio which is equal to the border width divided by the maximum border width.
4. Subtract the denominator value from the sum of the ratios calculated in step 3.
5. Calculate a value which is equal to the result of step 4 divided by 4 minus the denominator value.
6. Multiply the result of step 5 by 100 to obtain the centering index.

In the case of a perfect centering condition, where all four widths are equal, a flag can be inserted in the software to prevent division by zero, and output a centering index of 100.

At step 58, the centering index is displayed on the CRT, and if a hard copy of the centering index and the stamp image is desired, the index and the image can be output to the printer to produce a hard copy of the centering index value and the stamp image. The computer program will execute an inquiry statement at step 59 to ask the operator whether or not a hard copy is desired and if it is desired the hard copy is printed out at step 60 in the flow chart. Thereafter, the program ends or may be reset to begin analysis of another .CUT file at step 40.

Figure 3:
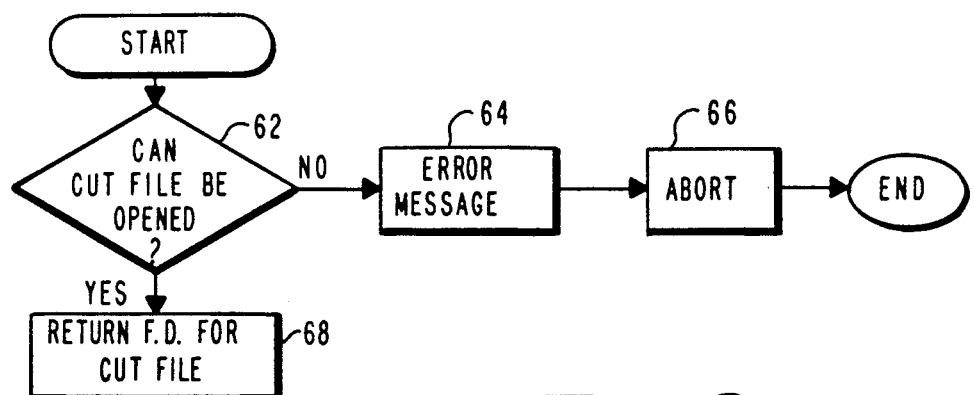
FIG. 3 is a flowchart of a subroutine for opening a .CUT file.

Referring now to FIG. 3, step 42 of FIG. 2 is further defined to include the steps 62–68. At step 62, computer 22 executes a call to a MS-DOS built-in routine requesting a particular .CUT file be opened. If the operating system determines that the disk drive is inaccessible as in the case where a head crash has occurred or the disc drive driver board is malfunctioning, the operating system will return an error message at step 64 and the program is aborted at step 66. If at step 62 the operating system returns a flag indicating that the file is successfully opened, then a file descriptor value is also returned for the .CUT file at step 68 completing the operation of step 42 of FIG. 2.

Figure 4:
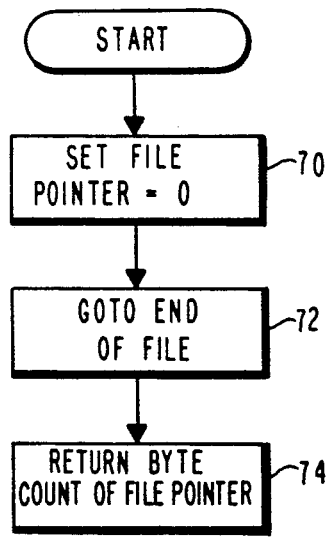
FIG. 4 is a flowchart of a subroutine for determining the size of a .CUT file.

Referring now to FIG. 4, a more detailed flow chart of step 44 of FIG. 2 is provided wherein the size of the file is determined by the computer. Initially, an operating system built-in subroutine is invoked at step 70 to set the file pointer to the beginning of the file. At step 72, a second operating system call is invoked to set the file pointer to the end of the file and a value is returned by the operating system subroutine at step 72 indicating how many bytes are contained in the file. Thereafter at step 74, the byte count is returned to the calling routine.

Figure 5:
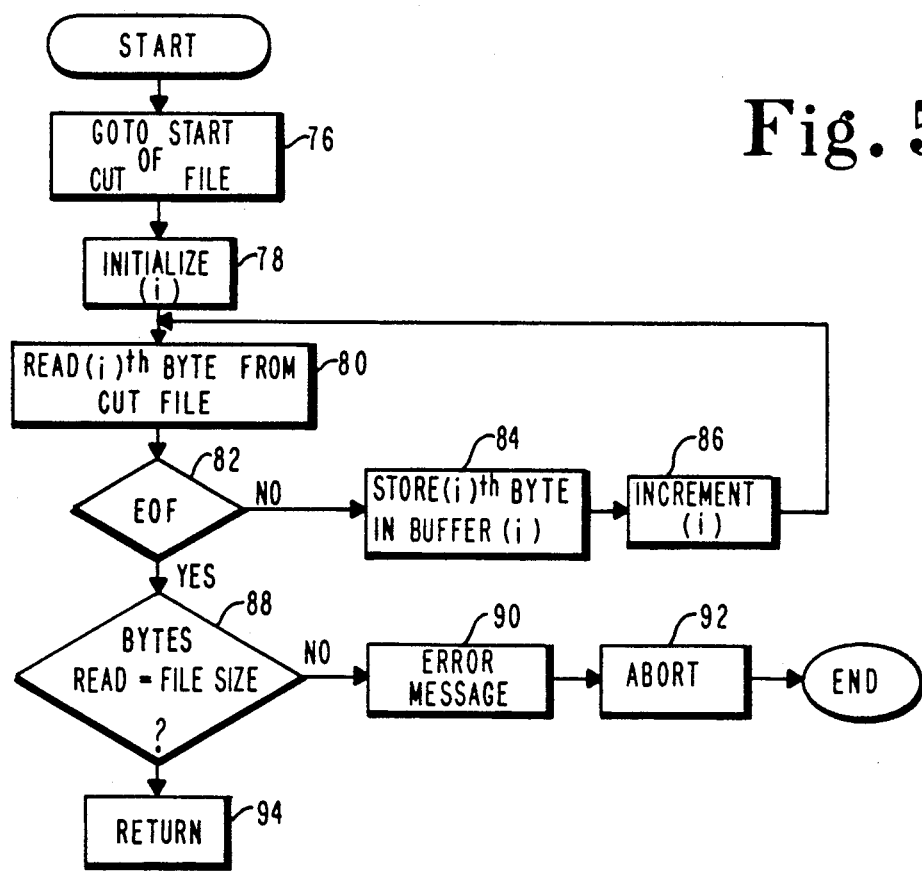
FIG. 5 is a flowchart of a subroutine for reading a .CUT file into memory.

Referring now to FIG. 5, a detailed flow chart is provided for step 48 of FIG. 2, wherein a .CUT file is read into memory from a disk drive. At step 76, a built-in subroutine call is executed to force the file pointer to point to the beginning of the .CUT file. At step 78, a loop counting variable (i), is initialized to zero, and at step 80 the (i)th byte is read from the .CUT file. At step 82, a status byte is examined after reading the (i)th byte from the file in step 80, and at step 82 if the end of file status is not encountered, then step 84 is executed. At step 84, the (i)th byte is stored in a RAM buffer in the (i)th location of the buffer. At step 86 the loop counter variable (i) is incremented and program flow continues at step 80 where the next or (i)th byte is read from the .CUT file. At step 82, if the end-of-file is encountered, i.e. the last byte is read from the .CUT file, then program flow continues at step 88 and the number of bytes read or the value of (i) is compared to the actual file size which has already been determined at step 44 of FIG. 2. If the number of bytes read or the value of (i) is not equal to the file size, then an error message is displayed at step 90 and the program is aborted at step 92. Alternatively, if the number of bytes read does in fact equal the file size then all the data is present in memory and program flow returns at step 94 to the calling routine.

Figure 6:
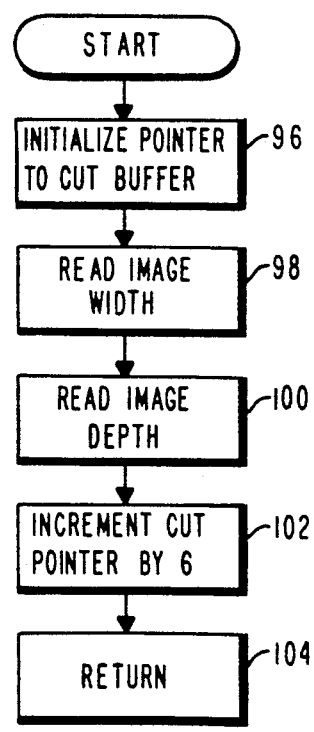
FIG. 6 is a flowchart of a subroutine for reading the header information of a .CUT file in memory.

Referring now to FIG. 6, the read header step 50 of FIG. 2 is expanded in the form of additional flow chart statements to further define the operations taking place therein. At step 96, a memory pointer is initialized to the beginning of the memory buffer containing the digitized image data from the .CUT file. At step 98, two bytes are read from the file at a predetermined memory location containing the image width in pixels. At step 100, two more bytes are read from a predetermined location of memory which indicate the depth of the image data file. At step 102, a memory pointer which is pointing at a particular data byte in the buffer containing the .CUT image file data is incremented by 6, and at step 104, the program flow returns to the calling program.

Figure 7:
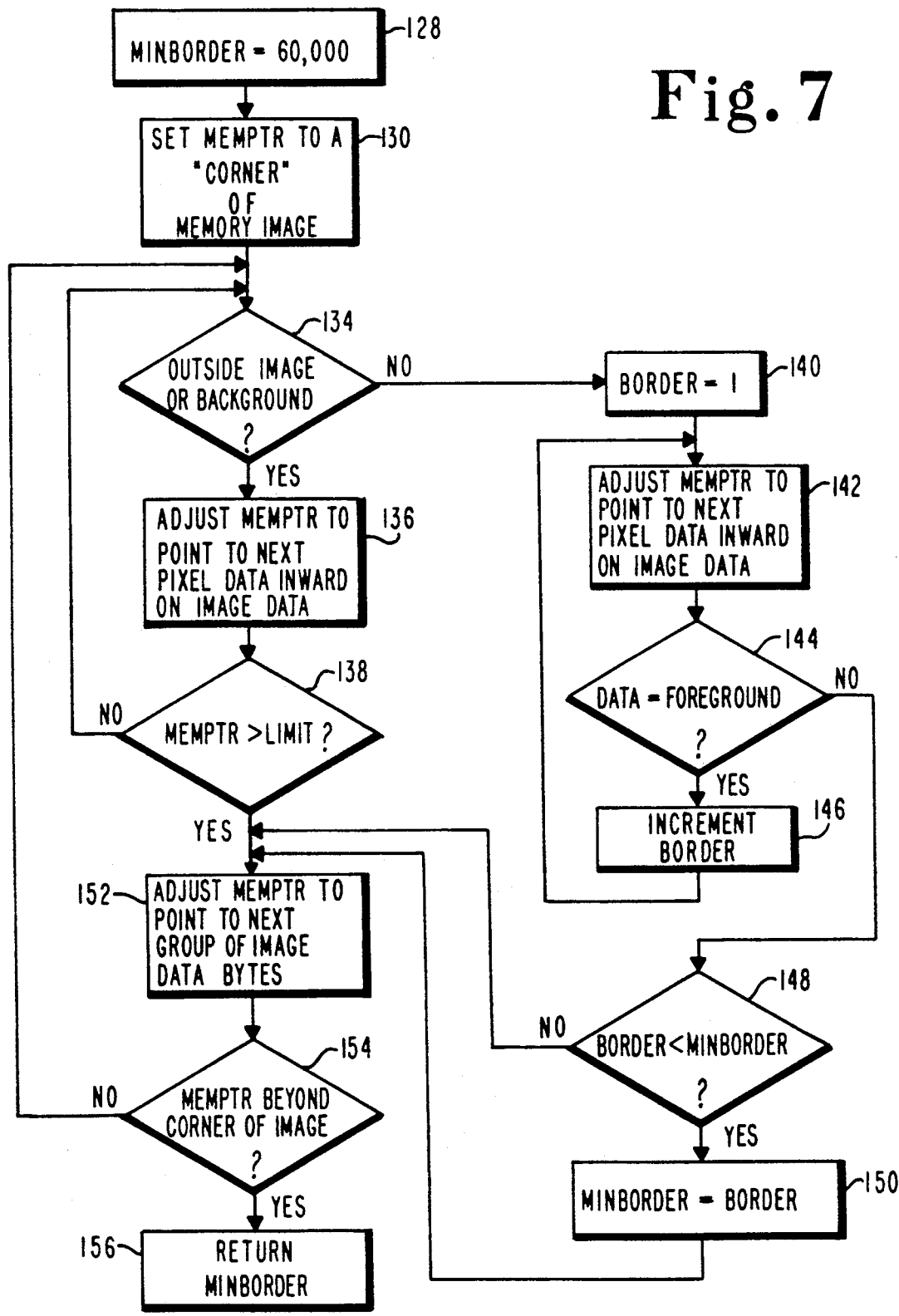
FIG. 7 is a flowchart of a subroutine for determining the minimum width of the border of a digitized stamp image.

Referring now to FIG. 7, a flow chart is shown generally describing the technique by which the software determines the border width for each edge of the stamp. It is to be understood that the flow chart of FIG. 7 depicts a routine which is invoked minimally four times in order to determine the border width for all four edges of the stamp image in memory. At step 128 the minimum border or MINBORDER variable is set to a value in excess of the width of the stamp image, typically 60,000 is a safe value. At step 130, the computer sets the memory pointer or MEMPTR to a "corner" of the memory image, i.e., the memory pointer is adjusted to one of the corner extremities of the image in the memory buffer in order to work along the edge of the stamp image data and analyze the image. At step 134, the data pointed to by MEMPTR is tested to determine if it is outside the image of the stamp or is background data. This test is performed in order to determine whether the data currently pointed to by MEMPTR represents a pixel outside the stamp image or "background" data of the image, corresponding to the stamp vignette or design pixels, or "foreground" data, which corresponds to the border area pixels of the stamp. Typical values for these color data indicators would be zero, which is black and is the outside of the stamp image; blue, which corresponds to one, and is the value for the background of the stamp; and fifteen which is white, the value for the foreground or border area of the stamp. If at step 134 the computer determines that the data is outside the image, or "background" data, then MEMPTR is adjusted to point to the next pixel data value inward in the image data array at step 136. At step 138, MEMPTR is compared to the limit for the far edge of the stamp to ensure that data outside the limits of the image array are not tested. If the computer determines that the data does not correspond to "outside image" data or "background" data at step 134, then step 140 is next executed and a variable BORDER is set equal to one. At step 142, the memory pointer is again set to the next pixel data value inward, towards the stamp vignette along a row or columnar path, in the image data matrix in memory. At step 144, the current data pointed to by MEMPTR is tested to see if it is "foreground" data. If it is "foreground" data, the border variable is incremented at step 146, and program flow returns to step 142. If the data is not "foreground" data at step 144, program flow continues at step 148 where the BORDER variable is tested to determine if it is less than the MINBORDER storage variable. If BORDER is less than MINBORDER, MINBORDER is set equal to the value in the variable BORDER. Upon the completion of either step 148 or step 150, step 152 is next executed by the computer wherein the MEMPTR variable is adjusted to point to the next group of image data bytes, i.e. the MEMPTR variable is given a new value to point to a new untested array of data in the next row if the left or right borders are being analyzed. Alternatively, MEMPTR is given a value to point to the next column if the top or bottom edges of the image are being analyzed. At step 154, the computer tests MEMPTR to determine whether or not it is set to a value in excess of the values corresponding to the corners of the image. This test is necessary to determine if the program has successfully found its way along one edge of the image from a corner established in step 130 to another corner tested for in step 154. If MEMPTR now points to a value in excess of the destination corner, then the value for MINBORDER is returned to the calling routine at step 156. If the destination corner has not been reached at step 154, program execution returns to step 134 to begin testing another array of data points corresponding to a new row or new column of image data bytes.

Referring now to FIGS. 8 and 9, a fixture for securing a stamp in position prior to digitization of the image is shown. The fixture 200 includes a base 202 made of aluminum, painted black, and including score lines on the top side at right angles to the aluminum channels 208 and 206. The top piece of the fixture 204 is made of clear lucite and is hingedly attached at edge 205 to the base 202. Handle 210 is attached to one of the forward edges of the top piece 204 to facilitate opening fixture 200 and placing a stamp in between the base 202 and the top piece 204. The channels 206 and 208 are intended as guides for the DFI scanning device, and are spaced to receive the DFI scanner therebetween. Thus, the stamp should be placed beneath top piece 204, in between the channels 208 and 206, preferably situated so that the stamp is squarely located with reference to the channels 206 and 208.

Referring now to FIG. 9, the stamp grading fixture 200 is shown in a partially open state. Non-skid feet 212 are attached to the bottom of the base 202 to prevent the fixture from slipping on the surface upon which it rests. Hinges 214 are attached to base 202 and top piece 204 at locations along the rear edge of the fixture 205. Channel 208 is shown mounted to the clear lucite top piece 204, and lift handle 210 is shown attached to the top piece 204.

Figure 10:
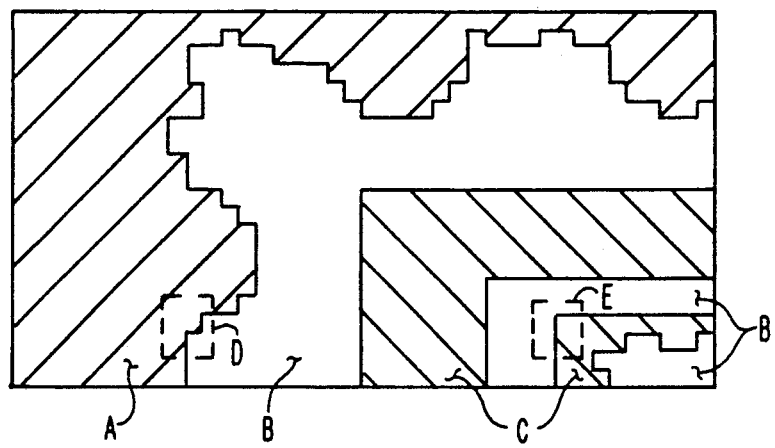
FIG. 10 is a diagramamatic representation of the digitized data defining an upper left corner of a stamp.
Figure 11:
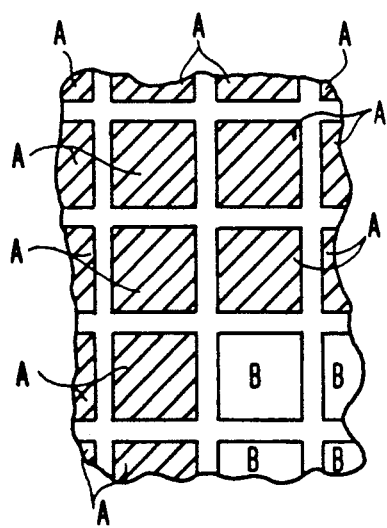
FIG. 11 is a diagramamatic representation of the area labeled D and bounded by a broken line in FIG. 10.
Figure 12:
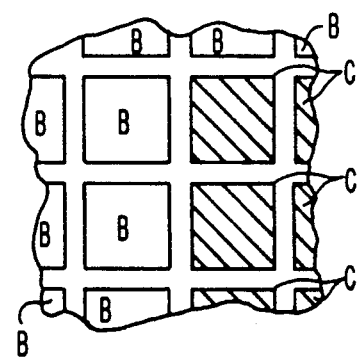
FIG. 12 is a diagramamatic representation of the area labeled E and bounded by a broken line in FIG. 10.

Referring now to FIGS. 10, 11 and 12, a detailed description of the result of the digitizing process, and in particular a diagramamatic representation of the image which may be built from the digitized data is shown.

Referring now to FIG. 10, an upper left-hand corner of a digitized stamp image is shown. The area of the image denoted "A" corresponds to the "outside image" data as discussed above. The area indicated by the letter "B" corresponds to the "foreground" or border of the stamp image. The area indicated by the letter "C" is the "background" or the vignette of the stamp. The area indicated by the broken line D is shown in magnified form in FIG. 11 so as to further illustrate the pixel coloring. Similarly, the area bounded by the broken line "E" is shown in magnified form in FIG. 12 to further illustrate the pixel pattern of a corner of the vignette.

Referring now to FIG. 11, the squares or pixels labeled "A" correspond to data which define "outside of image" data. The squares labeled with a "B" correspond to pixels having a "foreground" data value as determined by the digitizing hardware. Similarly, in FIG. 12, the squares labeled "B" would correspond to data values in memory having "foreground" values, and the squares labeled "C" correspond to "background" data or the vignette.

An additional variation of the disclosed invention includes a program for image rotation to correct for lack of squareness in the digitized image data prior to producing a hard copy of the image. Also, a program is contemplated for removing the cancellation mark from a digitized image prior to analysis for centering, which may be necessary with a heavy cancellation mark. However, the disclosed system provides for manual manipulation of the pixel colors when displayed in a magnified form on a video display. The recognition of cancellation marks and removal thereof from the image data only serves to provide a faster result or index as compared with manual removal of the cancellation marks.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method for determining the centering condition of a vignette surrounded by a rectangular border having perforation markings at the outermost edges of said border, said method comprising the steps of:
    (a) digitizing an image of said vignette and said border to produce a pixel data file;
    (b) analyzing the pixel data file and determining four minimum pixel distances from the perforation markings to the vignette at the top, bottom, left side and right side of the vignette;
    (c) calculating a centering index for the image using the four minimum pixel distances; and
    (d) displaying said centering index.

2. The method of claim 1 wherein the step of calculating said centering index is comprised of the following steps:
    (a) selecting a maximum value from the four minimum pixel distances;
    (b) adding one to a denominator value having an initial value of zero for each of the four minimum pixel distances that equals the maximum value;
    (c) calculating four ratio values by dividing each pixel distance by the maximum value;
    (d) summing the four ratio values to produce a ratio sum;
    (e) subtracting the denominator value from the ratio sum to produce a new ratio sum;
    (f) dividing the new ratio sum by the difference of four minus the denominator value to produce an average ratio sum; and
    (g) multiplying the average ratio sum by 100 to produce a grading index.

3. The method according to claim 1 including the step of printing a centering index certificate including the centering index.

4. The method according to claim 3 including the step of printing the digitized image of said vignette on said centering index certificate.

5. A computer programmed to determine the relationship between the design and the unprinted space between the design and the edges of a substantially rectangular stamp, said computer performing the sequential steps of:
    digitizing an image of the stamp and producing a set of data points corresponding to a digitization of said image;
    locating the four edges of the stamp by analyzing said data points and determining the relative location of each edge of the stamp;
    determining four minimum border width values measured in terms of data points, each border width value determined by measuring from each edge of the stamp to the design;
    calculating a centering index using the four border width values; and
    displaying the centering index.

6. The method of claim 5 wherein said calculating a centering index step includes the following steps:
    (a) selecting a maximum value from the four border width values;
    (b) adding one to a denominator value having an initial value of zero for each of the four border width values that equals the maximum value;
    (c) calculating four ratio values by dividing each border width value by the maximum value;
    (d) summing the four ratio values to produce a ratio sum;
    (e) subtracting the denominator value from the ratio sum to produce a new ratio sum;
    (f) dividing the new ratio sum by the difference of four minus the denominator value to produce an average ratio sum; and
    (g) multiplying the average ratio sum by 100 to produce a centering index.

7. The method of claim 5 wherein each of said edges of said stamp is defined by perforation markings and said locating step includes the steps of determining for each edge of the stamp the distance in data points between the design and the nearest perforation marking of each stamp edge.

8. The method of claim 7 including the steps of outputting said set of data points to a printer to produce a hard copy of the digitized stamp image.

9. The method of claim 7 wherein said calculating a centering index step includes the following steps:
    (a) selecting a maximum value from the four border width values;
    (b) adding one to a denominator value having an initial value of zero for each of the four border width values that equals the maximum value;
    (c) calculating four ratio values by dividing each border width value by the maximum value;
    (d) summing the four ratio values to produce a ratio sum;
    (e) subtracting the denominator value from the ratio sum to produce a new ratio sum;
    (f) dividing the new ratio sum by the difference of four minus the denominator value to produce an average ratio sum; and (g) multiplying the average ratio sum by 100 to produce a centering index.

10. A stamp grading apparatus for determining the centering quality of a stamp having a rectangular border surrounding a vignette, said stamp grading apparatus comprising:

image digitizing means for transforming an image of the stamp vignette and border into a plurality of digital data values; and digital analysis means connected to said image digitizing means for analyzing said digital data values, said digital analysis means including:

memory means for reading in and storing said digital data values from said image digitizing means;

means for analyzing said digital data and determining four border width values representing the minimal distance from the stamp vignette to the innermost edge of each side of the rectangular border; and means for calculating a centering index from the four border width values.

11. The stamp grading apparatus of claim 10 wherein said means for calculating a centering index includes means for:

(a) selecting a maximum value from the four border width values;

(b) adding one to a denominator value having an initial value of zero for each of the four border width values that equals the maximum value;

(c) calculating four ratio values by dividing each border width value by the maximum value;

(d) summing the four ratio values to produce a ratio sum;

(e) substracting the denominator value from the ratio sum to produce a new ratio sum;

(f) dividing the new ratio sum by the difference of four minus the denominator value to produce an average ratio sum; and (g) multiplying the average ratio sum by 100 to produce a centering index.

12. The stamp grading apparatus of claim 11 including means for printing an image of said stamp.

13. The stamp grading apparatus of claim 12 including means for positioning and securing said stamp in place when said image digitizing means is transforming an image of the stamp into digital data values.

14. The stamp grading apparatus of claim 13 wherein said means for positioning includes a base and alignment means for aligning said image digitizing means with said base.

15. An apparatus for grading vignette centering of a stamp in relation to the perforation markings of four edges of the stamp, said apparatus comprising:

image digitizing means for creating digital data describing in detail the stamp and surrounding perforations;

memory means connected to said image digitizing means for storing and recall of said digital data;

digital analysis means connected to said memory means for recalling said digital data from said memory means and analyzing said data to determine the location of the stamp vignette with respect to the stamp edges, said digital analysis means calculating a grading index defining the centering quality of the vignette relative to the edges of the stamp; and display means connected to said digital analysis means for visually displaying said grading index.

16. The apparatus for grading vignette centering of claim 15 wherein said digital analysis means and said memory means comprise a computer having RAM and ROM.

17. The apparatus for grading vignette centering of claim 16 wherein said computer includes a serial data interface, and said image digitizing means is connected to and communicates with said computer via said serial data interface.

18. The apparatus for grading vignette centering of claim 17 wherein said display means is a CRT display.

19. The apparatus for grading vignette centering of claim 18 wherein said display means includes a dot matrix printer.

* * * * *